(12) United States Patent
Reed et al.

(10) Patent No.: US 10,010,969 B2
(45) Date of Patent: Jul. 3, 2018

(54) SHAPED WELDING

(71) Applicant: Thompson Friction Welding, West Midlands (GB)

(72) Inventors: Stephen Reed, Staffordshire (GB); Frederick John Harris, Solihull (GB); John Searle, Staffordshire (GB)

(73) Assignee: Kuka Systems UK Limited (GB)

(*) Notice: Subject to any disclaimer, the term of this patent is extended or adjusted under 35 U.S.C. 154(b) by 0 days.

(21) Appl. No.: 14/774,736

(22) PCT Filed: Mar. 11, 2014

(86) PCT No.: PCT/GB2014/050722
§ 371 (c)(1),
(2) Date: Sep. 11, 2015

(87) PCT Pub. No.: WO2014/140560
PCT Pub. Date: Sep. 18, 2014

(65) Prior Publication Data
US 2016/0023301 A1    Jan. 28, 2016

(30) Foreign Application Priority Data
Mar. 11, 2013    (GB) .................................. 1304330.2

(51) Int. Cl.
*B23K 20/12*    (2006.01)

(52) U.S. Cl.
CPC ...... *B23K 20/1225* (2013.01); *B23K 20/1205* (2013.01); *B23K 20/126* (2013.01)

(58) Field of Classification Search
CPC .................. B23K 20/122–20/1215; B23K 20/1285–20/1295

USPC .............................. 228/2.1–2.3, 112.1–114.5
See application file for complete search history.

(56) References Cited

U.S. PATENT DOCUMENTS

| | | | | |
|---|---|---|---|---|
| 5,492,581 A * | 2/1996 | Searle | ................ | B23K 20/1205 156/580 |
| 5,518,562 A * | 5/1996 | Searle | .................. | B23K 20/129 156/580 |
| 5,549,236 A * | 8/1996 | Reinhardt | .............. | B23K 20/12 228/114.5 |
| 5,813,593 A * | 9/1998 | Galaske, Jr. | ....... | B23K 20/1205 228/112.1 |
| 5,865,364 A * | 2/1999 | Trask | ................. | B23K 20/1205 228/112.1 |
| 6,244,495 B1 * | 6/2001 | Rapp | .................. | B23K 20/1205 228/44.3 |

(Continued)

FOREIGN PATENT DOCUMENTS

| | | |
|---|---|---|
| CN | 101020275 | 8/2007 |
| DE | 1910531 A1 * | 10/1969 |

(Continued)

OTHER PUBLICATIONS

Machine translation of CN101020275A (no date available).*

*Primary Examiner* — Kiley Stoner
(74) *Attorney, Agent, or Firm* — Hartman Global IP Law; Gary M. Hartman; Domenica N. S. Hartman

(57) ABSTRACT

A method for friction welding, the method comprising: locating a first workpiece in a recess or aperture of a first tool; bringing a weld face of the first and a weld face of a second workpiece into frictional engagement; and moving the first tool and the second workpiece relative to one another.

8 Claims, 4 Drawing Sheets

(56) References Cited

U.S. PATENT DOCUMENTS

| | | | |
|---|---|---|---|
| 6,354,482 B1* | 3/2002 | Diebold | B23K 20/129 156/580.2 |
| 6,817,144 B1* | 11/2004 | Tavivian | A47K 3/30 4/607 |
| 2002/0148878 A1* | 10/2002 | Honeck | B23K 20/1205 228/110.1 |
| 2003/0034378 A1 | 2/2003 | Diebold et al. | |
| 2004/0112941 A1 | 6/2004 | Slattery | |
| 2005/0274010 A1* | 12/2005 | Rawson | B23K 20/1205 29/889.1 |
| 2006/0051211 A1* | 3/2006 | Ferte | B23K 20/129 416/213 R |
| 2006/0157538 A1* | 7/2006 | Crasser | B23K 20/10 228/113 |
| 2007/0287266 A1* | 12/2007 | Chung | B23K 26/10 438/460 |
| 2008/0185420 A1* | 8/2008 | Swallow | B23K 20/1205 228/125 |
| 2008/0308611 A1* | 12/2008 | Alessi | B23K 20/1205 228/112.1 |
| 2010/0126973 A1* | 5/2010 | Frye | B23K 26/0823 219/121.71 |
| 2012/0048477 A1* | 3/2012 | Johnson | B23K 20/1205 156/580 |
| 2012/0100387 A1* | 4/2012 | Houston | B21D 7/022 428/603 |
| 2012/0111629 A1* | 5/2012 | Patrikios | H01R 4/029 174/74 R |
| 2012/0224972 A1* | 9/2012 | Stiehler | B23K 13/00 416/223 A |
| 2012/0233859 A1* | 9/2012 | Cattiez | B21D 26/021 29/889.7 |
| 2012/0280021 A1* | 11/2012 | Stiehler | B23K 20/129 228/114.5 |
| 2013/0139968 A1* | 6/2013 | Johnson | B23K 20/1205 156/350 |
| 2013/0221070 A1* | 8/2013 | Okuno | B23K 20/26 228/2.3 |
| 2014/0050519 A1* | 2/2014 | Oiwa | B23K 20/12 403/270 |
| 2014/0150955 A1* | 6/2014 | Slattery | B23K 20/1205 156/73.5 |
| 2014/0326414 A1* | 11/2014 | Johnson | B23K 20/1205 156/580 |
| 2014/0326781 A1* | 11/2014 | Johnson | B23K 20/1205 228/112.1 |
| 2014/0338841 A1* | 11/2014 | Johnson | B23K 20/1205 156/580.1 |

FOREIGN PATENT DOCUMENTS

| | | | | |
|---|---|---|---|---|
| EP | 0624419 | A2 * | 11/1994 | |
| EP | 2002920 | A2 * | 12/2008 | B23K 20/1205 |
| FR | 2672831 | | 8/1992 | |
| GB | 1315676 | | 5/1973 | |
| GB | 2277896 | A * | 11/1994 | B23K 20/1205 |
| JP | WO 2012124826 | A1 * | 9/2012 | H01R 4/023 |

* cited by examiner

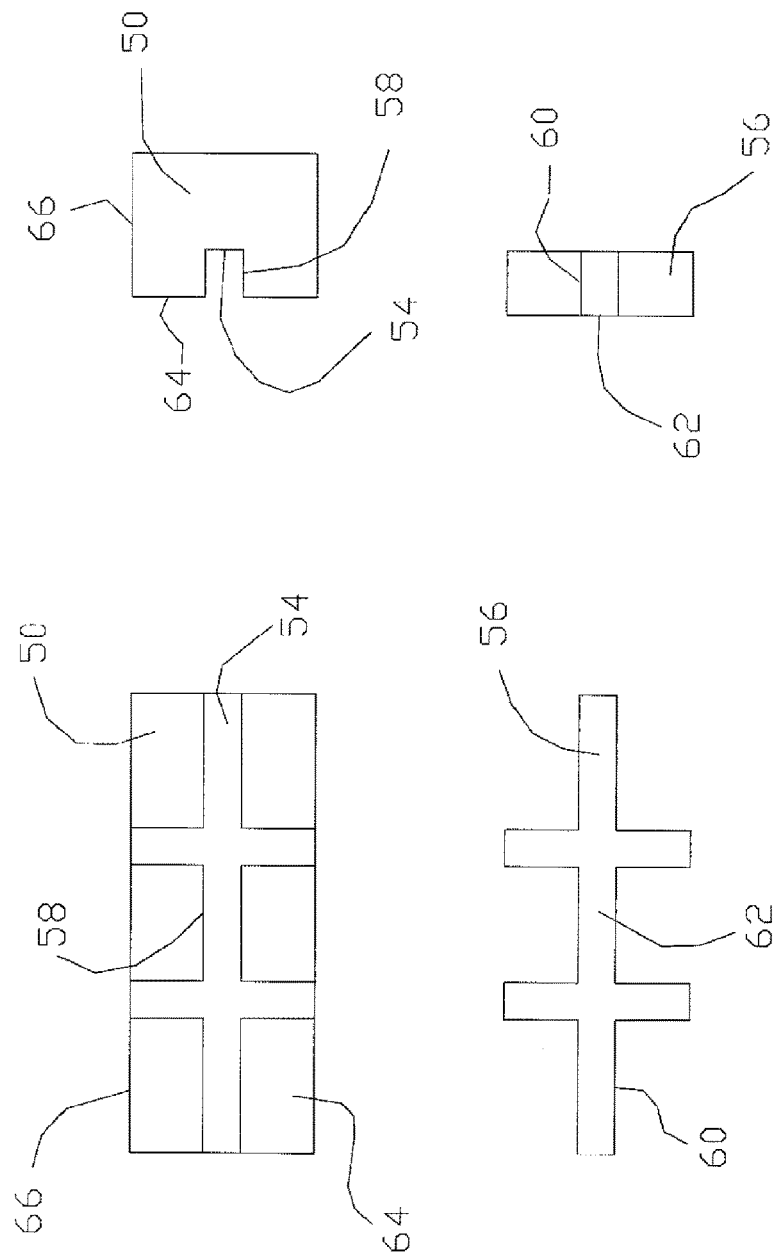

SHAPED WELDING

The present invention relates to methods and apparatus for friction welding.

Friction welding is used in engineering fields as a means for joining two bodies together without the requirement for a solder, flux or filler material. The technique offers certain advantages over traditional welding methods, as its relatively melt-free nature prevents grain growth in high engineered materials. Moreover, the rippled sheets of the material created around the weld join and known as "flash", carry debris and dirt away from the joint, negating the requirement to perform significant pre-treatment of the join surfaces.

Furthermore, friction welding can be used to join two materials of very different melting points, such as aluminium and steel, which would not be possible using traditional welding methods.

This is particularly useful in the aerospace industry where the additional weight of, say, bolts or rivets that may otherwise be required to ensure adequate join strengths, is undesirable.

Spin welding, or rotational friction welding is when one of the two bodies to be joined is rotated at high speed and then held under pressure against the other body.

The join is usually set by keeping the join under pressure after the rotation has finished.

Linear friction welding, on the other hand, is performed when one or both of the bodies to be joined is linearly oscillated with respect to the other.

A forge force is applied to the bodies, typically to the stationary body during and after oscillation to effect the join. Of course, the clamping force must be sufficient to hold the bodies steady during the frictional movement stage and the application of the forge force in order to ensure that required manufacturing tolerances are met.

However, while bodies having regular and/or straight edges are often relatively straightforward to clamp into a friction welding device, bodies which are irregular and/or have curved sides are difficult to hold steady under the large forces that are exerted upon them. As a consequence, the results of friction welding irregular and/or curved sided bodies using prior art techniques are often unsatisfactory.

Accordingly, it is an object of the present invention to provide an apparatus for method and apparatus for friction welding which enables the welding of irregular and/or curved sided bodies.

In a first aspect, the invention provides a method for friction welding, the method comprising:
- locating a first workpiece in a recess or aperture of a first tool;
- bringing a weld face of the first and a weld face of a second workpiece into frictional engagement;
- moving the first tool and the second workpiece relative to one another.

Preferably, the recess or aperture of the first tool is shaped in a complementary manner to at least part of the first workpiece. Preferably the aperture or recess is larger than the workpiece.

The inventors have found that by providing a tool having a recess or aperture that is shaped complementarily to the first workpiece, but larger than the first workpiece, say to leave a 0.01 mm to S mm gap, preferably 0.01 mm to 1 mm gap, therebetween, complex shapes of workpieces can be joined by friction welding. In particular, it has been found that within a short time frame of the welding operation commencing the tool and workpiece will expand due to frictional heating effects to bridge the gap to provide an interference fit and thereby lock the workpiece to the tool. Optionally, the second workpiece is located within a recess or aperture of a second tool. Preferably, the recess or aperture of the second tool is shaped in a complementary manner to at least part of the second workpiece. Preferably, the aperture or recess is larger than the second workpiece.

Preferably, the method further comprises applying a forge to the first and/or second workpiece to join the first and second workpieces together.

Preferably the first and/or the second workpiece is oscillated at from 10 to 100 oscillations per second, e.g. at least 25-45 oscillations per second in a direction substantially perpendicular to the weld forces of the first and second workpieces.

Preferably, the neither of the first and/or second weld pieces is oscillated while the forge force is applied.

Preferably the forge force has a magnitude of between 4 tonnes and 150 tonnes, e.g. between 80 tonnes and 120 tonnes.

Preferably the forge force has a magnitude of at least 65 tonnes, e.g. at least 80 tonnes.

Preferably the forge force applies no rotational movement to the first or second workpiece, e.g. the forge force applied no rotational movement about a centroid of the interface between the weld faces of the first and second workpieces.

Preferably the forge force applies movement to the first and/or second workpiece in one or a combination of longitudinal and transverse directions such as to minimise rotational movement about the centroid of the interface between the weld faces of the first and second workpieces.

Preferably the oscillation of the first and/or second workpieces is effected by an oscillator.

Preferably, the first and second workpieces are positioned such that, in use, the centre of mass of the oscillator is coplanar with the weld faces.

Preferably the first and second workpieces are positioned such that the or a centroid of the interface between the first and second weld faces is aligned with the centre of mass of the oscillator.

Preferably, forge forces are balanced, e.g. the oscillator and forge axis act on substantially the centre of the weld.

Preferably, the weld may comprise a single part or a multiple part weld.

Preferably the method comprises allowing the first and second workpieces to cool before releasing the forge force.

Preferably the method comprises removing the first tool from the first workpiece after the weld is complete.

Preferably the method comprises removing the second tool from the second workpiece after the weld is complete.

Preferably the method comprises repeating all steps to join e.g. a third workpiece and a fourth workpiece using the first tool and, if required, one or more additional tools.

According to another aspect of the present invention, there is provided an apparatus for friction welding at least two parts together, the apparatus including:
- a mounting plate having means for receiving a first tool;
- the tool having at least one recess or aperture for holding a first workpiece;
- a forge upon which a second workpiece or tool for holding a second workpiece may be mounted;
- an oscillator for effecting oscillation of the mounting plate with a linear motion;
- the forge being moveable to apply a force in a direction substantially perpendicular to the linear oscillation.

In a further aspect, the present invention provides a tool for holding a workpiece during a friction welding operation, the tool comprising an aperture or recess shaped in a complementary manner to at least part of said workpiece, wherein the aperture or recess is sized to leave a space of about 0.01 mm to 10 mm (e.g. 0.01 mm to 1 mm) between an inner wall of the aperture or recess and an outer wall of said workpiece.

In a further aspect, the present invention provides a combination of a workpiece and a tool for holding the workpiece during a friction welding operation, the tool comprising an aperture or recess shaped in a complementary manner to at least part of said workpiece, wherein the aperture or recess is sized to leave a space of about 0.01 mm to 10 mm (e.g. 0.01 mm to 1 mm) between an inner wall of the aperture or recess and an outer wall of said workpiece.

Embodiments of the present invention will now be described with reference to the following drawings.

FIG. 4 shows a tool and workpiece according to the present invention.

Figure 1:
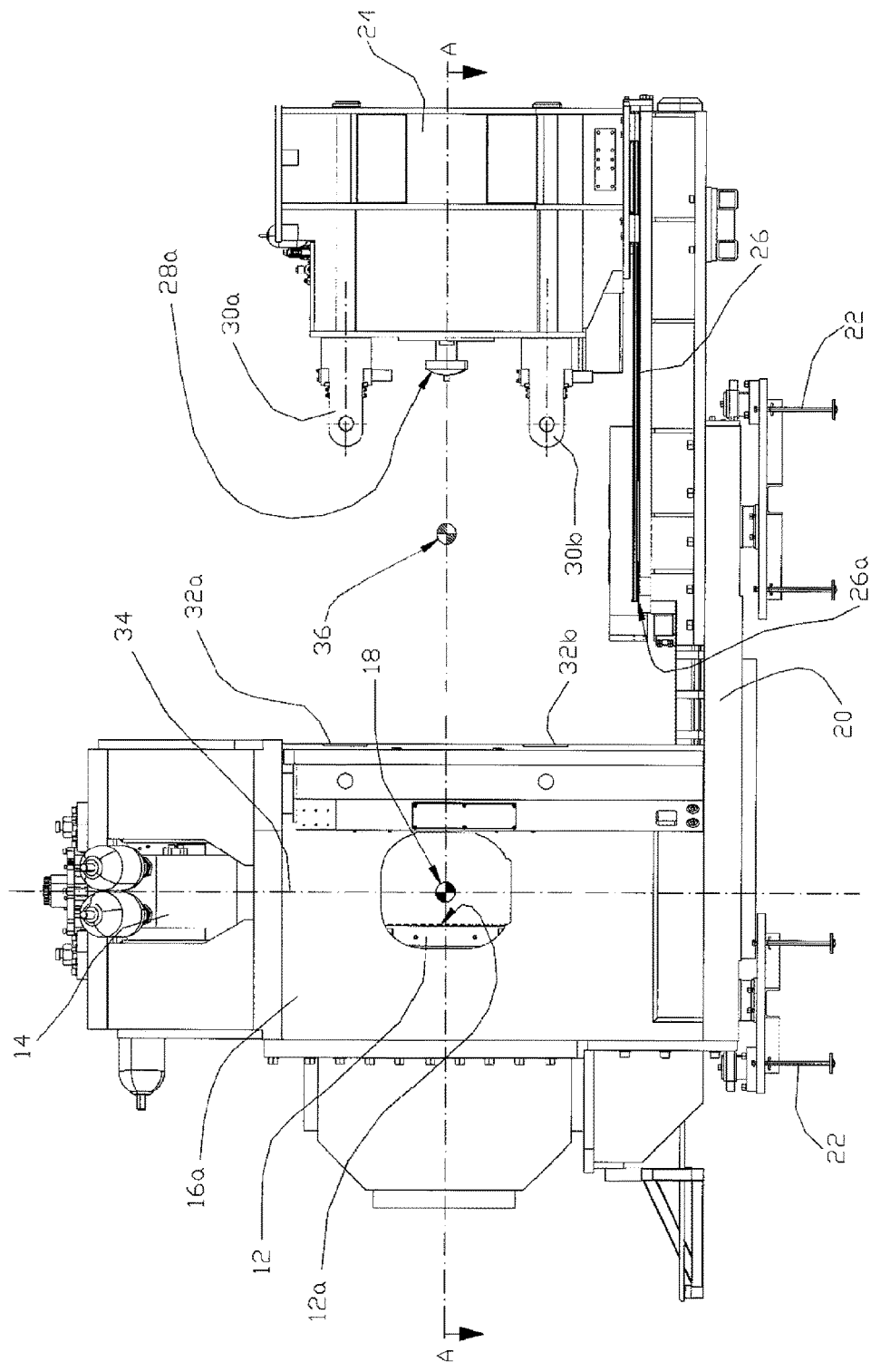
FIG. 1 shows a friction welding apparatus in a profile view.
Figure 2:
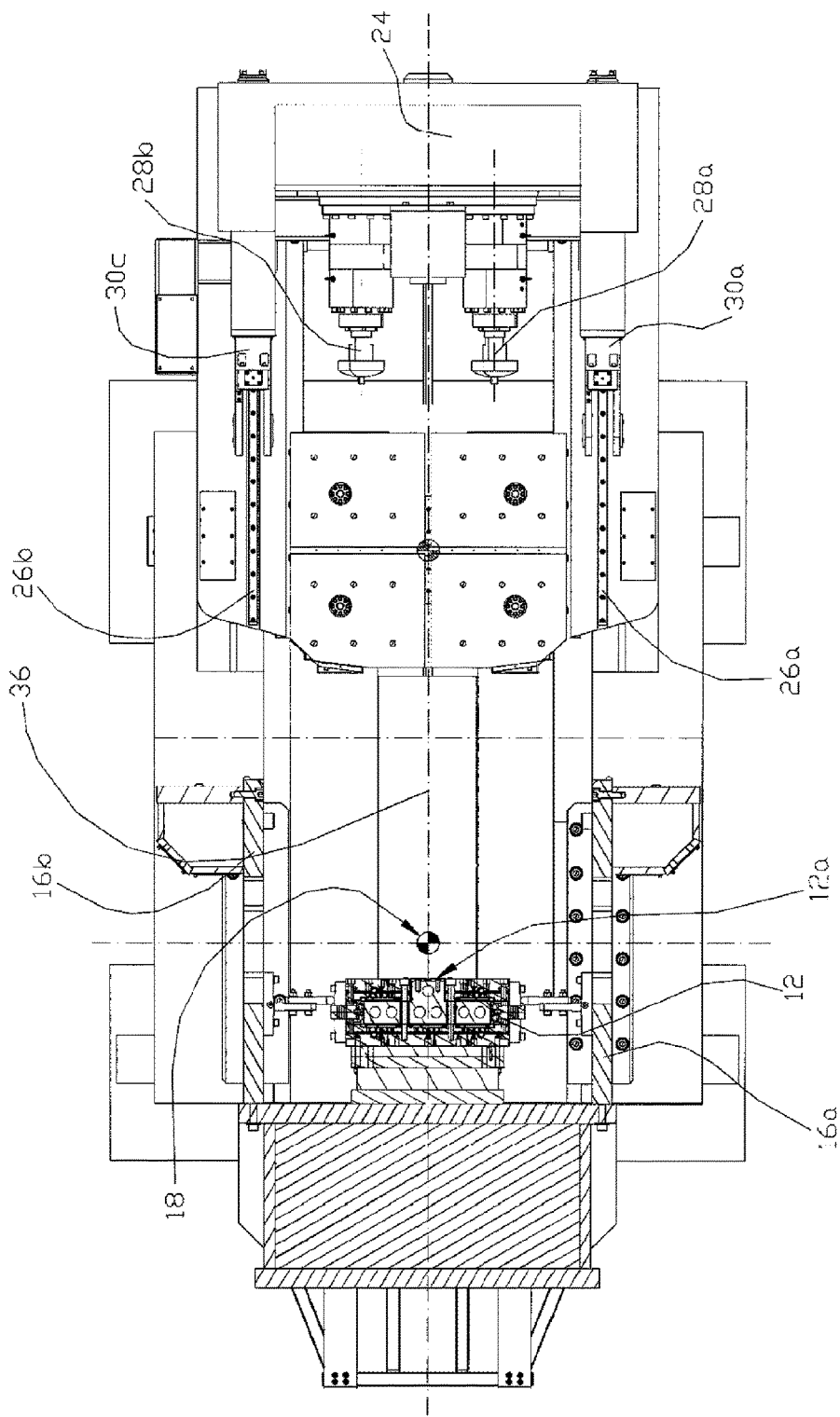
FIG. 2 shows a friction welding apparatus in plan view.
Figure 3:
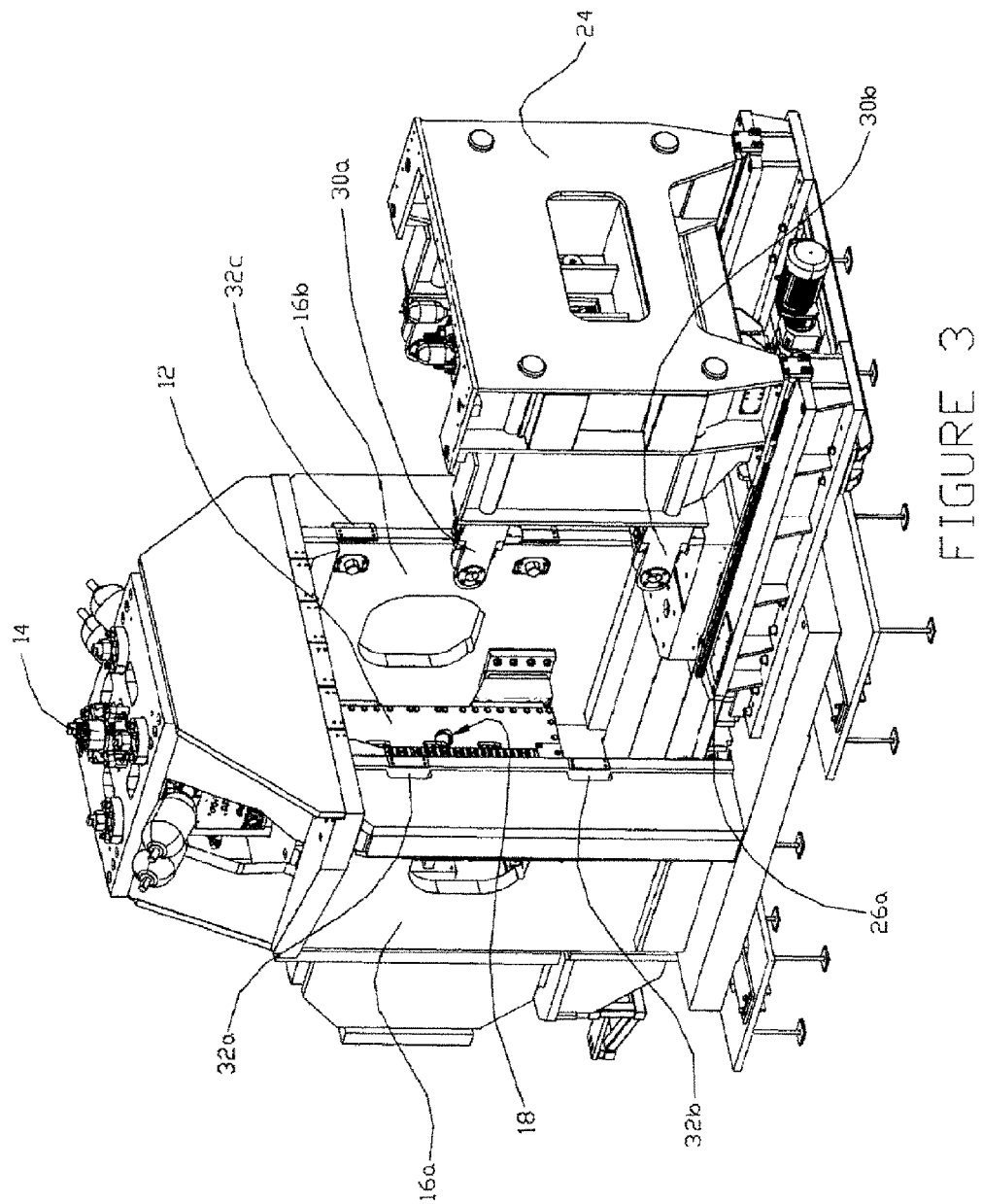
FIG. 3 shows a friction welding apparatus in perspective view.

FIGS. 1 to 3 shows a linear friction welding apparatus 10. The apparatus 10 comprises a mounting plate 12 for mounting a first workpiece thereon. The mounting plate 12 is held vertically by and below an oscillator 14 and between a pair of parallel side plates 16a, 16b. A hydraulic clamp (not shown) is arranged to clamp workpieces to the mounting plate 12.

The oscillator 14 is fixed atop the side plates 16a, 16b such that it rests above the gap therebetween.

The side plates 16a, 16b are mounted upon a chassis 20 which may be fixed to the floor by fixings 22. Also mounted on the chassis 20 is a forge 24 by means of rails 26 which are substantially perpendicular to the face 12a of the mounting plate 12. The forge 24 is movable along the rails 26 towards the mounting plate 12. The forge 24 comprises a pair of forge cylinders 28a, 28b extending from the forge 24 toward the mounting plate 12 through which the forge force is applied. A hydraulic clamp (not shown) is arranged to clamp workpieces in front of the forge cylinders 28a, 28b.

Four male locking members 30a, 30b, 30c, 30d extend from the corners of the forge 24 towards the side plates 16a, 16b. Corresponding lock recesses 32a, 32b, 32c, 32d in the side plates 16a, 16b are formed to receive the male locking members 30a, 30b, 30c, 30d when the forge 24 is positioned at the forward extremity 26a of the rails 26.

The positioning of the contingent parts of the apparatus 10 contributes to the improved operation in use during friction welding.

The oscillator 14 is positioned such that its centre of mass lies on a vertical line 34 midway between the side plates 16a, 16b and between the mounting plate 12 and the forge 24.

The position of the mounting plate 12 relative to the vertical line 34 is adjustable via adjustment means (not shown).

This vertical line 34 is intersected at a weld point 18 by a horizontal line 36 which can be drawn from the forge 24 at a point equidistant between the two forge cylinders 28a, 28b, the horizontal line 36 being parallel to the rails 26.

The weld point 18 represents the centroid of the weld interface area when the workpieces are at the finished weld position. The mounting plate 12 allows for the positioning of workpieces accordingly.

In this specific embodiment, the positioning of the locking members 30a, 30b, 30c, 30d is also regular with respect to the weld point.

In particular, where the locking members are aligned vertically (i.e. the member 30a above the member 30b and the member 30c above the member 30d) they are arranged such that the centreline of each is an equal distance in the vertical plane and an equal distance in the horizontal plane from the horizontal line 36.

The increased stability afforded to the machine by some or all of these arrangements permits a large forge force to be used during welding.

In a first method of friction welding utilising the above apparatus, a first workpiece is attached to the mounting plate 12 such that the centroid of its intended weld area is positioned at the weld point 18.

A second workpiece is attached to the forge 24 by a hydraulic clamp such that the centroid of the intended weld area is positioned can be brought to bear against the first workpiece at the weld point 18.

The forge 24 is then moved to its forward position along rails 26 and the locking members 30a, 30b, 30c, 30d are engaged and locked in the corresponding recesses 32a, 32b, 32c, 32d, thereby bringing the workpieces to bear against each other.

The oscillator 14 is then activated to effect frictional movement between the workpieces in the vertical plane along the line 34. The oscillator 14 preferably oscillates the mounting plate 12 at a frequency of from 10 to 100 oscillations per second, e.g. at least 25-45 oscillations per second.

The friction between the workpieces causes the regions around the frictional contact surfaces of the workpieces to soften. When these regions are sufficiently soft, and plastic, and considered to have reached a fusion point, as would be understood by a person skilled in the art, the oscillator 14 is deactivated and the mounting plate is realigned such that the workpieces are in their intended final position.

The forge 24 is then activated such that the forge cylinders 28a, 28b apply a forge force of up to 500 tonnes to the second workpiece, thereby joining the two workpieces together. Once the workpieces have cooled and hardened, the forge force is removed and the workpieces, now joined, are removed from the apparatus 10.

A first tool 50 is provided, for use with the apparatus 10, to enable e.g. irregularly shaped workpieces 56 to be held in the apparatus 10.

Typically, the tool 50 is made for use in welding a specific shape of workpiece and may be used many times in welding articles of that shape.

The tool 50, an example of which is shown in plan view in FIG. 4, includes a recess 54, shaped in a complementary manner to part of a first workpiece 56.

The workpiece 56 fits inside the recess 54 leaving a gap of 0.05 mm to 0.075 mm between the inner wall 58 of the recess 54 and its outer edge 60. When the workpiece 56 is fully inserted into the recess 54 its weld face 62 sits proud of the upper face 64 of the tool 50 by around 5 mm, allowing for some burn-off (e.g. about 3 mm) during welding.

The outer edges 66 of the tool 50 are designed to be clamped by known clamping means, such as the hydraulic clamp of the apparatus 10, as would be understood by one skilled in the art, to e.g., a mounting plate of a friction welding apparatus.

The tool 50 is preferably made from a metal such as aluminium, titanium, steel or nickel alloys or the like.

The tool 50 may be shaped by any known cutting technique; however, preferred techniques are laser cutting, which is particularly preferred when making thin sheet components, and water jet cutting (WJC).

In use, the tool 50, having a first workpiece 56 loaded into its recess 54 is hydraulically clamped against the mounting plate 12 of a friction welding apparatus 10, preferably having the centroid of the weld face 62 positioned at the weld point 18.

A second workpiece is clamped to the forge 24, its weld face positioned to make frictional contact with the weld face 62 of the first workpiece 56 when the forge 24 is at its weld position.

The forge 25 is brought to its weld position to bring the first and second workpieces into frictional contact and the oscillator 14 is actuated.

As the first workpiece 56 heats under friction, it expands to fill the gap between the inner wall 58 of the recess 54 of the tool 50 and the outer edge 60 of the workpiece 56, thereby centring the workpiece 56 and holding it firmly in the intended position.

When the workpieces have reached the desired temperature and plasticity, the oscillator 14 is deactivated and the forge cylinders 28a, 28b apply a forge force to the workpieces to affect the weld.

The forge force holds the workpieces until substantial cooling has taken place, by which time the weld is firm and the first workpiece 56 has re-contracted and can be easily removed from the tool 50.

The tool 50 may be readily reused.

It will be appreciated that it is necessary to heat the two workpieces to a temperature at which they become soft and deform plastically. This is referred to as the fusion point and when this point is reached the two workpieces can be joined together. It will be appreciated that the fusion point will depend upon the precise metals or alloy compositions of the two workpieces.

Workpieces of any shape may be friction welded using this technique, provided a corresponding tool can be manufactured.

Optimum results are obtained when forge forces of less than 150 tonnes, e.g. less than 120 tonnes are used.

As the skilled person understands, tools according to the present invention can be used to hold one, some or all of the workpieces to be welded in a single operation.

No doubt many other effective alternatives will occur to the skilled person. It will be understood that the invention is not limited to the described embodiments and encompasses modifications apparent to those skilled in the art lying within the spirit and scope of the claims appended hereto.

The invention claimed is:

1. A method for friction welding a first workpiece to a second workpiece, the first workpiece having sides that are curved and/or define multiple interior and exterior corners, the method comprising:

locating the first workpiece in a recess or aperture of a first tool, the recess or aperture being shaped in a complementary manner to at least part of the sides of the first workpiece and being sized to leave a space of 0.01 mm to 1 mm between an inner wall of the recess or aperture and the at least part of the sides of the first workpiece, wherein the first tool holds the first workpiece for friction welding;

bringing a weld face of the first workpiece while located in and held by the first tool and a weld face of a second workpiece to be friction welded to the first workpiece into frictional engagement; and moving the first tool and the second workpiece relative to one another to heat the weld faces of the first and second workpieces wherein the first workpiece expands to bridge the space to provide an interference fit and thereby lock the first workpiece to the first tool and to form a weld that joins the first and second workpieces together.

2. The method as claimed in claim 1, wherein the first tool has outer edges that are clamped to a friction welding apparatus capable of bringing the weld faces of the first and second workpieces into frictional engagement.

3. The method as claimed in claim 1, wherein the second workpiece is located within a recess or aperture of a second tool, wherein the recess or aperture of the second tool is shaped in a complementary manner to at least part of the second workpiece, and wherein the aperture or recess of the second tool is larger than the second workpiece.

4. The method as claimed in claim 1, wherein the method comprises applying a forge force to the first and/or second workpiece to join the first and second workpieces together, the forge force being applied until cooling has taken place so that the weld has become firm and the first workpiece has re-contracted and is removable from the first tool.

5. The method as claimed in claim 4, wherein the first and/or the second workpiece is oscillated in a direction substantially perpendicular to the forge force applied to the first and/or second workpieces.

6. The method as claimed in claim 5, wherein the first and/or the second workpiece is oscillated at about 10 to 100 oscillations per second.

7. The method as claimed in claim 1, wherein the weld comprises a multiple part weld, wherein the first tool is used to hold at least some of the workpieces to be welded in a single operation.

8. The method as claimed in claim 1, further comprising initially shaping the first tool by laser cutting or water-jet cutting before locating the first workpiece in the recess or aperture of the first tool.

* * * * *